(12) United States Patent
Liu et al.

(10) Patent No.: US 8,939,420 B2
(45) Date of Patent: Jan. 27, 2015

(54) REINFORCING STRUCTURE AND ELECTRONIC DEVICE USING THE SAME

(71) Applicants: Hong Fu Jin Precision Industry (ShenZhen) Co., Ltd., Shenzhen (CN); Hon Hai Precision Industry Co., Ltd., New Taipei (TW)

(72) Inventors: Wei-Xia Liu, Shenzhen (CN); Kui-Jun Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 0 days.

(21) Appl. No.: 13/789,705

(22) Filed: Mar. 8, 2013

(65) Prior Publication Data
US 2014/0001319 A1    Jan. 2, 2014

(30) Foreign Application Priority Data

Jun. 28, 2012 (CN) .......................... 2012 1 02176875

(51) Int. Cl.
*F16M 11/16* (2006.01)
*F16M 11/20* (2006.01)
*F16M 11/22* (2006.01)

(52) U.S. Cl.
CPC ............. *F16M 11/20* (2013.01); *F16M 11/16* (2013.01); *F16M 11/22* (2013.01); *F16M 2200/08* (2013.01); *Y10S 248/903* (2013.01); *Y10S 248/917* (2013.01)

USPC ................... 248/346.01; 248/188.1; 248/903; 248/917; 361/679.01

(58) Field of Classification Search
CPC ....................................................... F16M 11/16
USPC .............. 248/188.1, 188.2, 346.01, 917, 919, 248/924, 903; 361/679.01
See application file for complete search history.

(56) References Cited

U.S. PATENT DOCUMENTS

| | | | | |
|---|---|---|---|---|
| 3,611,953 A | * | 10/1971 | Schottl | 108/139 |
| 3,699,901 A | * | 10/1972 | Cook, III | 108/57.25 |
| 4,591,123 A | * | 5/1986 | Bradshaw et al. | 248/179.1 |
| 5,407,156 A | * | 4/1995 | Rossman et al. | 248/118.1 |
| 5,564,669 A | * | 10/1996 | Wu | 248/346.01 |
| 6,971,320 B1 | * | 12/2005 | Maldonado-Cortes et al. | 108/55.3 |
| 7,607,621 B2 | * | 10/2009 | Cai et al. | 248/188 |
| 2010/0014220 A1 | * | 1/2010 | Tai | 361/679.01 |
| 2012/0127378 A1 | * | 5/2012 | Takao et al. | 348/836 |
| 2012/0212685 A1 | * | 8/2012 | Tanaka | 348/843 |

* cited by examiner

*Primary Examiner* — Steven Marsh
(74) *Attorney, Agent, or Firm* — Novak Druce Connolly Bove + Quigg LLP

(57) ABSTRACT

An electronic device includes a base and a reinforcing structure. The base comprises a first surface and a second surface opposite to the first surface. The reinforcing structure comprises a first reinforcing bead, a second reinforcing bead, a plurality of first ribs and a plurality of second ribs. The second ribs radially extend from the first and second reinforcing beads and cross connect with the first ribs, for reinforcing the strength and rigidity of the base.

18 Claims, 5 Drawing Sheets

REINFORCING STRUCTURE AND ELECTRONIC DEVICE USING THE SAME

BACKGROUND

1. Technical Field

The present disclosure relates to an electronic device; and particularly to an electronic device having a reinforcing structure.

2. Description of Related Art

Electronic devices, such as computer monitors and televisions are progressively being reduced in weight and thickness. However, as the screen size becomes larger, the base supporting the electronic devices can either be too unwieldy or too flimsy to move around on a supporting surface.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

A first embodiment of the present disclosure will be described with reference to the drawings.

Figure 1:
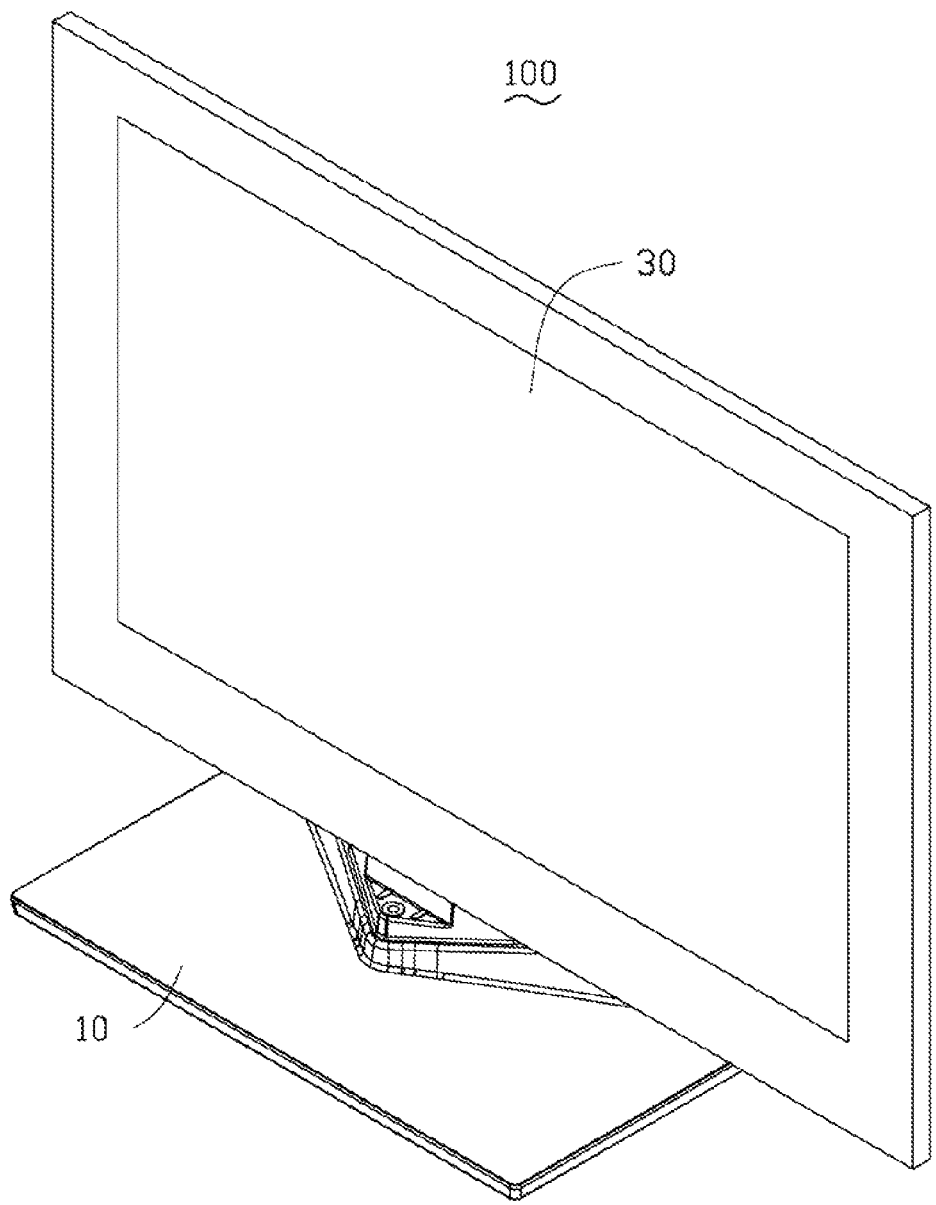
FIG. 1 is an isometric view of an electronic device in a first embodiment.
Figure 3:
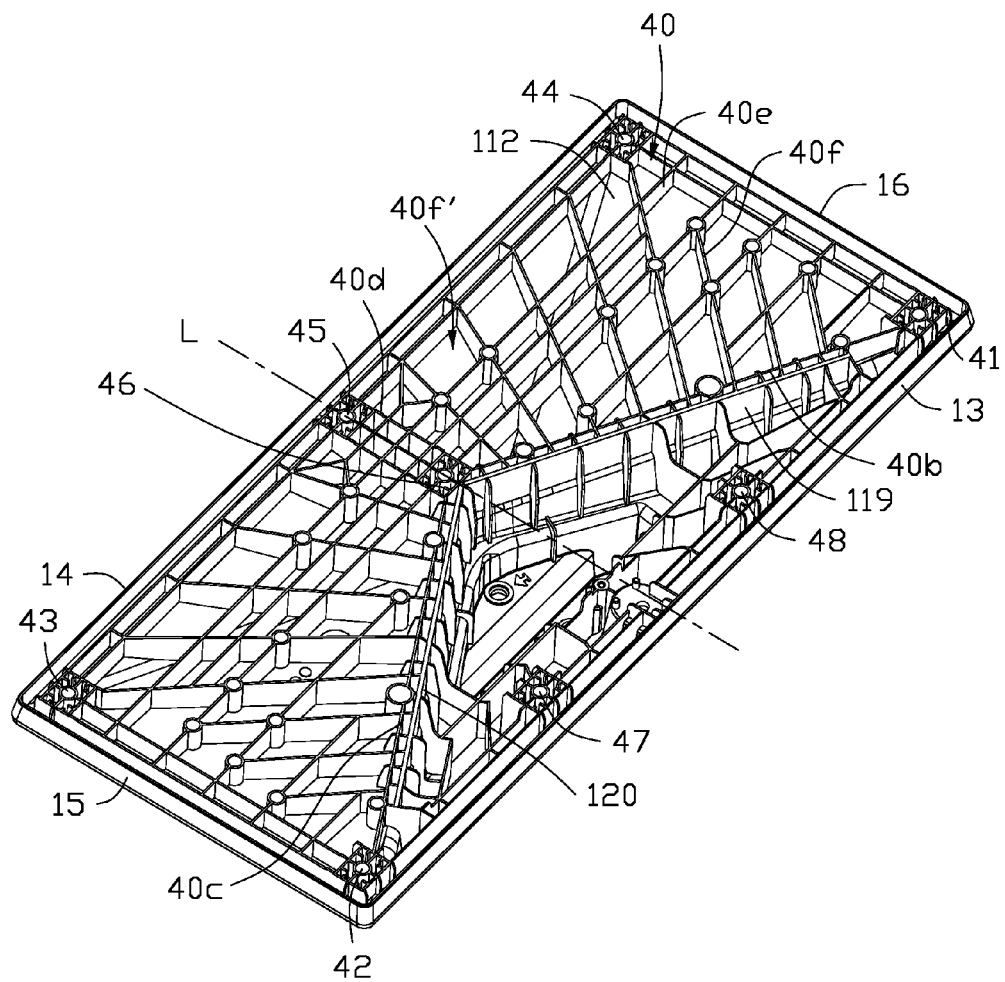
FIG. 3 is an isometric view of an inner surface of the base shown in FIG. 1.

Referring to FIG. 1, an electronic device 100 includes a base 10, a display unit 30 and a reinforcing structure 40 (shown FIG. 3). The base 10 supports the display unit 30. The reinforcing structure 40 is secured to the base 10 for reinforcing the strength of the base 10. The electronic device 100 may be, for example, a computer monitor or a television. In the embodiment, the electronic device 100 is a television.

Figure 2:
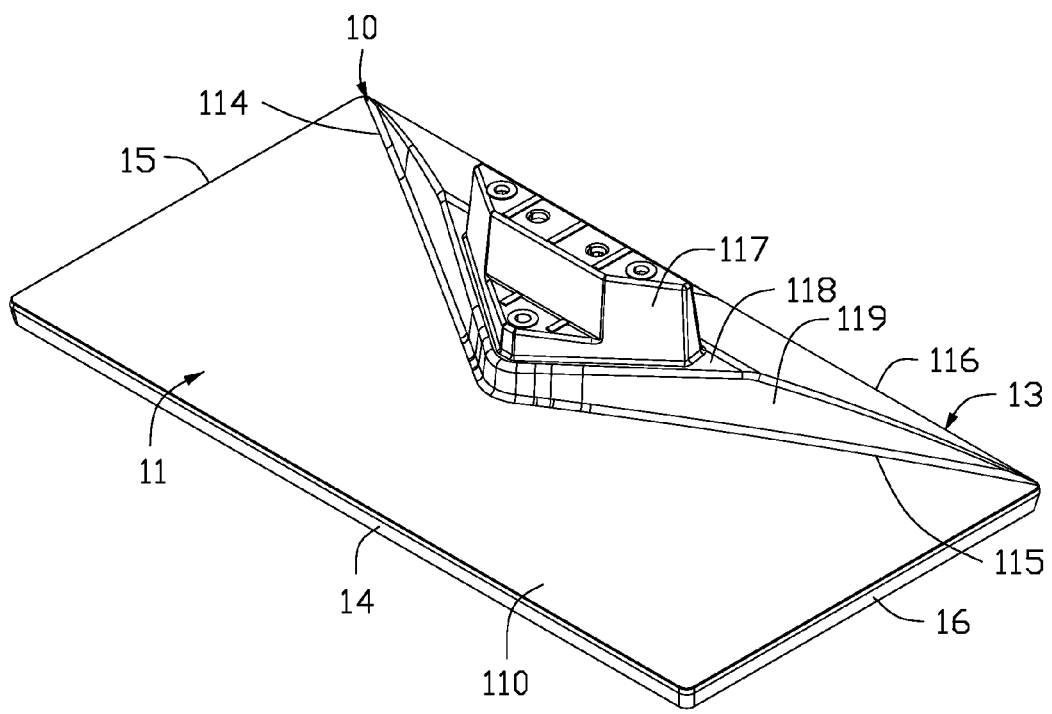
FIG. 2 is a partial isometric view of the base of the electronic device in FIG. 1.

Referring to FIG. 2, the base 10 is substantially rectangular, and includes a top wall 11 and four sidewalls (hereinafter, a first sidewall 13, a second sidewall 14 opposite to the first sidewall 13, a third sidewall 15, and a fourth sidewall 16 opposite to the third sidewall 15).

The top wall 11 includes a first surface 110 and a second surface 112 (FIG. 3) opposite to the first surface 110. When the electronic device 100 is placed on a supporting surface (such as a table), the second surface 112 faces the supporting surface. The first surface 110 defines a first straight line 114, a second straight line 115 and a third straight line 116. The first straight line 114 and the second straight line 115 are of equal length and connect to opposite ends of the third straight line 116. The third straight line 116 is a rim of the first sidewall 13 connected to the first surface 110. The first straight line 114, the second straight line 115 and the third straight line 116 cooperatively form a triangular shape. The second surface 112 defines a central line L perpendicular to the second sidewall 14. The third sidewall 15 is symmetrical with the fourth sidewall 16 relative to the central line L.

A mounting component 117 slantingly extends upwardly from the first, second and third straight lines 114, 115 and 116. When viewed from the first surface 110, the mounting component 117 protrudes from the first surface 110; when viewed from the second surface 112, the mounting component 117 is recessed (the recess is not labeled) to have a first wall 119 and a second wall 120. The first wall 119 corresponds to the second straight line 115. The second wall 120 corresponds to the first straight line 114. An end of the mounting component 117 away from the first surface 110 defines a top surface 118. The top surface 118 is substantially triangular and is parallel to the first surface 110. A fixing component 119 further protrudes from the top surface 118 for mounting the display unit 30.

Referring to FIG. 3, the reinforcing structure 40 is secured to the second surface 112. The reinforcing structure 40 includes eight reinforcing portions 41, 42, 43, 44, 45, 46, 47 and 48, two first reinforcing beads 40b, two second reinforcing beads 40c, a plurality of connecting ribs 40d, a plurality of first ribs 40e, and a plurality of second ribs 40f.

The reinforcing portions 41, 42, 43, 44, 45, 46, 47 and 48 are substantially pane-shaped, and are positioned on the second surface 112. The reinforcing portions 41 and 42 are positioned on the corners of the second surface 112 formed by the first, third and fourth sidewalls 13, 15 and 16. The reinforcing portions 43 and 44 are positioned on the corners of the second surface 112 formed by the second, third and fourth sidewalls 14, 15 and 16. The reinforcing portion 45 is arranged between the reinforcing portions 43 and 44. The reinforcing portion 46 is arranged on the center of the second surface 112. The central line L aligns with the reinforcing portions 45 and 46. The reinforcing portions 47 and 48 are arranged between the reinforcing portions 41, 42 and are symmetrical about the central line L.

The first reinforcing beads 40b protrude from the first wall 119 and are arranged between the reinforcing portions 41, 46. The second reinforcing beads 40c protrude from the second wall 120 and are arranged between the reinforcing portions 42, 46. Thus, the first and second reinforcing beads 40b, 40c cooperate with the first sidewall 13 to form a triangle corresponding to the bottom of the mounting component 117. The connecting ribs 40d connect with the reinforcing portions 45 and 46.

The first ribs 40e connect between the third sidewall 15 and the fourth sidewall 16. The first ribs 40e are parallel to the second sidewall 14 and are spaced apart from each other. The second ribs 40f radially extend from the first and second reinforcing beads 40b, 40c to the second, third and fourth sidewalls 14, 15, 16, and cross connect with the first ribs 40e. Thus, the first ribs 40e and the second ribs 40f form a plurality of interconnected cells (cells 40f'). Each of the cells 40f' is substantially parallelogram shaped.

In detail, a portion of the second ribs 40f are arranged between the connecting ribs 40d and the first reinforcing beads 40b. Each of the second ribs 40f in this portion radially extend from the first reinforcing bead 40b to the second sidewall 14 and the fourth sidewall 16, and are gradually inclined from the connecting ribs 40d to the fourth sidewall 16. Another portion of the second ribs 40f are equally arranged between the connecting ribs 40d and the second reinforcing bead 40c. Each of the second ribs 40f in this latter portion radially extend from the second reinforcing bead 40c to the second sidewall 14 and the third sidewall 15, and are gradually inclined from the connecting ribs 40d to the third sidewall 15. The reinforcing structure 40 is integrally formed with the second surface 112, and is coplanar with the first, second, third and fourth sidewalls 13, 14, 15 and 16. Thus, when the electronic device 100 is placed on the supporting surface, the reinforcing structure 40 is in complete and secure contact with the supporting surface for reinforcing the base 10.

In the embodiment, the reinforcing portions 41, 42, 43, 44, 45, 46, 47 and 48 are positioned on the periphery and the center of the second surface 112. Thus, the rigidity of the periphery and the center of the base 10 are improved. The first and second reinforcing beads 40b, 40c are positioned around the bottom of the mounting component 117. In this way, the strength and rigidity of the mounting component 117 is improved. The first ribs 40e are positioned over the entire second surface 112, and the second ribs 40f radially extend from the first and second reinforcing beads 40b, 40c and cross connect with the first ribs 40e, for reinforcing the strength of the rest of base 10.

Figure 4:
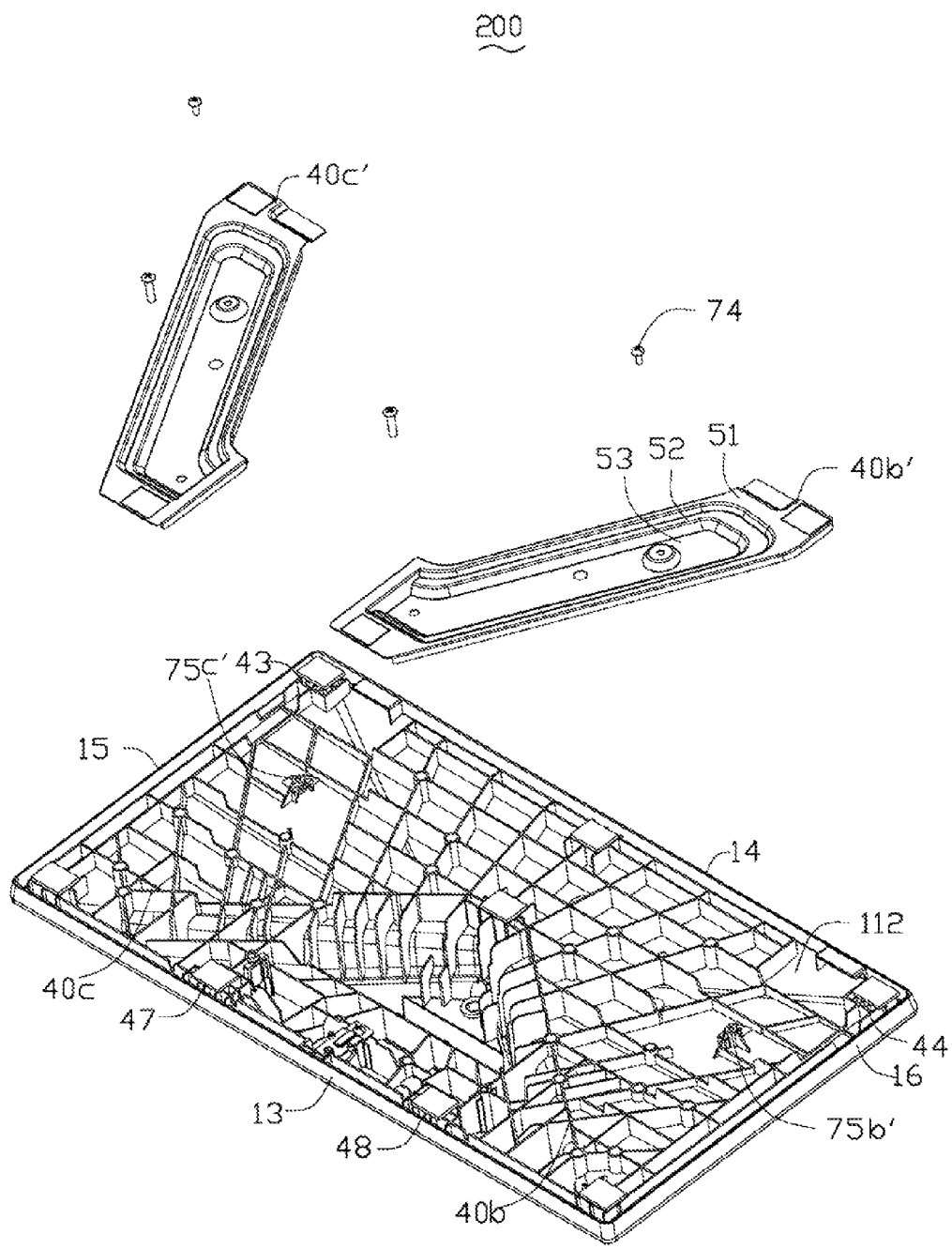
FIG. 4 is a partially disassembled view of an inner face of a base of the electronic device in a second embodiment.
Figure 5:
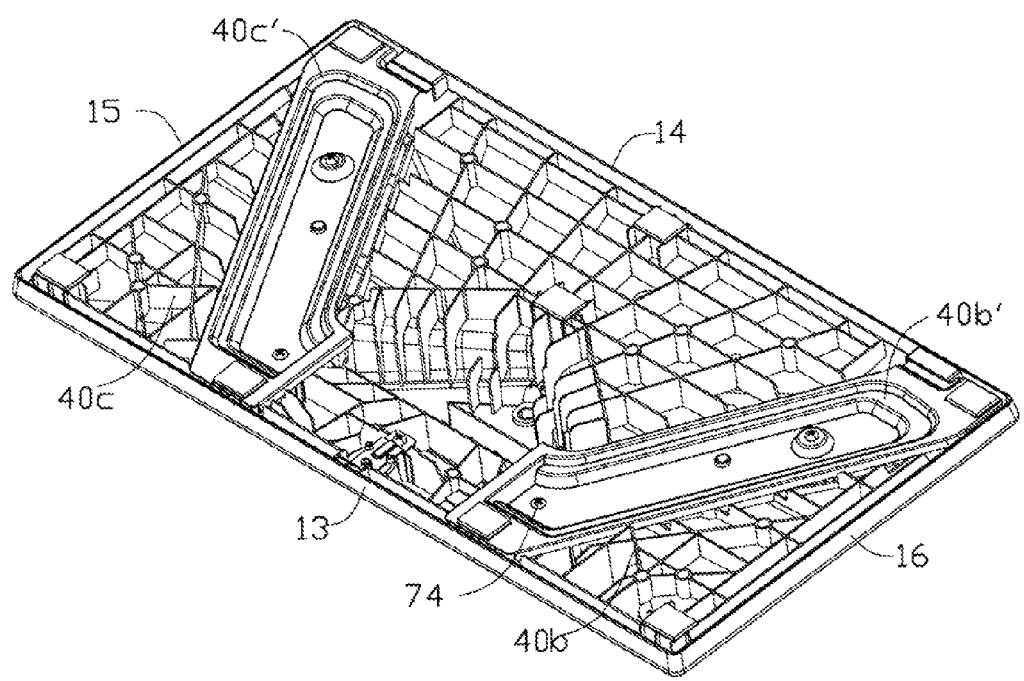
FIG. 5 is a partial, assembled view of the base in FIG. 4.

Referring to FIGS. 4 and 5, an electronic device 200 with a reinforcing structure 50 according to a second embodiment is provided. The difference between the electronic device 200 and the electronic device 100 is that the electronic device 200 further includes a first supporting plate 40b' and a second supporting plate 40c' of the same configuration. Opposite ends of the first supporting plate 40b' are arranged between the reinforcing portions 44 and 48. Opposite ends of the second supporting plate 40c' are arranged between the reinforcing portions 43 and 47. For simplicity, only the first supporting plate 40b' is described.

The first supporting plate 40b' includes a third surface 51 opposite to the second surface 112. A first recess portion 52 is recessed from the third surface 51. The bottom of the first recess portion 52 is further recessed into a depression supporting portion 53. Thus, the third surface 51, the first depression portion 52 and the second depression portion 53 form a ladder-shape. In the embodiment, the first and second supporting plates 40b' and 40c' are made of metal. Two pairs of fixing posts (hereinafter, the first fixing posts 75b' and the second fixing posts 75c') protrude from the second surface 112 and are symmetrical about the central line L. Two fixing posts 75b' are adjacent to the first sidewall 13 and are positioned on opposite sides of the first reinforcing bead 40b, and fixing posts 75c' are adjacent to the third sidewall 15 and are positioned on opposite sides of the second reinforcing bead 40c.

In assembly, the first supporting plate 40b' is fixed on the first fixing posts 75b' by a plurality of fixing elements 74, with opposite ends thereof arranged between the reinforcing portions 44 and 48. The second supporting plate 40c' is fixed on the second fixing posts 75c' by the fixing elements 74, with opposite ends thereof arranged between the reinforcing portions 43 and 47. Thus, the first and second supporting plates 40b', 40c' cross over the first and second reinforcing beads 40b, 40c respectively and are symmetrically about each other relative to the central line L. The angle between the first and second supporting plates 40b', 40c' is 60 degrees.

In the embodiment, the reinforcing structure 40 can be integral with the second surface 112. The configuration of the second surface 112 of the base 10 can be changed according to need. For example, when the size of the display is smaller than 32 inch, the user can choose the base 10 of the first embodiment; when the size of the display is larger than 32 inch, the user can choose the base 10 of the second embodiment.

Although information and the advantages of the present embodiments have been set forth in the foregoing description, together with details of the structures and functions of the present embodiments, the disclosure is illustrative only; changes may be made in detail, especially in the matters of shape, size, and arrangement of parts within the principles of the present embodiments to the full extent indicated by the broad general meaning of the terms in which the appended claims are expressed.

What is claimed is:

1. An electronic device, comprising:
   a base comprising a first surface;
   a second surface opposite to the first surface;
   a mounting component recessed from the second surface and protruding out of the first surface, the mounting component comprising a first wall and a second wall connected to the first wall; and
   a reinforcing structure secured to the second surface, the reinforcing structure comprising a first supporting plate and a second supporting plate positioned on the second surface, opposite ends of the first supporting plate are arranged on opposite sides of the first wall, and opposite ends of the second supporting plate are arranged on opposite sides of the second wall;
   wherein the reinforcing structure comprises a first reinforcing bead, a second reinforcing bead connected to the first reinforcing bead, a plurality of first ribs and a plurality of second ribs, the second ribs radially extend from the first and second reinforcing beads and cross connect with the first ribs, for reinforcing the strength of the base.

2. The electronic device as claimed in claim 1, wherein the first ribs are parallel to each other, the second ribs cross connect the first ribs and form a plurality of interconnected four-sided cells.

3. The electronic device as claimed in claim 1, wherein the first reinforcing bead protrude from the first wall, and the second reinforcing bead protrude from the second wall; the second ribs radially extend from the first and second reinforcing beads corresponding to the mounting component.

4. The electronic device as claimed in claim 3, wherein the base comprises a first sidewall and a second sidewall; two ends of first and second walls connect to opposite ends of the first sidewall, and other two ends of the first and second walls connect to each other; and the second sidewall is opposite to the first sidewall.

5. The electronic device as claimed in claim 4, wherein the first ribs are parallel to the first sidewall.

6. The electronic device as claimed in claim 4, wherein the reinforcing structure comprises a connecting rib arranged between the second sidewall and the mounting component.

7. The electronic device as claimed in claim 6, wherein a portion of the second ribs arranged between the first reinforcing bead and the connecting rib radially extend from the first reinforcing bead and are inclined from the connecting rib to the first reinforcing bead; other portion of the second ribs arranged between the second reinforcing bead and the connecting rib radially extend from the second reinforcing bead and are inclined from the connecting rib to the second reinforcing bead.

8. The electronic device as claimed in claim 1, wherein the reinforcing structure comprises at least one reinforcing portion, the at least one reinforcing portion is positioned on a corner of the second surface for reinforcing the rigidity of the base.

9. The electronic device as claimed in claim 1, wherein each first and second supporting plates comprise a third surface, a first recess portion is recessed in the third surface for reinforcing rigidity of the corresponding first and second supporting plates.

10. The electronic device as claimed in claim 9, wherein a second recess portion is recessed in the bottom of the first recess portion for further reinforcing rigidity of the corresponding first and second supporting plates.

11. A reinforcing structure secured to a base comprising a first surface and a second surface opposite to the first surface, comprising:
 a first reinforcing bead protruding from the second surface;
 a second reinforcing bead connected to the first reinforcing bead;
 a plurality of first ribs protruding from the second surface;
 a plurality of second ribs;
  wherein the base comprises a mounting component recessed from the second surface and protrudes out of the first surface, the mounting component comprises a first wall and a second wall connected to the first wall, the reinforcing structure further comprises a first supporting plate and a second supporting plate positioned on the second surface, opposite ends of the first supporting plate are arranged on opposite sides of the first wall, and opposite ends of the second supporting plate are arranged on opposite sides of the second wall the second ribs are radially extended from the first and second reinforcing beads and cross connect with the first ribs, for reinforcing the strength of the base.

12. The reinforcing structure as claimed in claim 11, wherein the first ribs are parallel to each other, the second ribs cross connect the first ribs and form a plurality of interconnected quadrangle cells.

13. The reinforcing structure as claimed in claim 11, wherein the first reinforcing bead protrude from the first wall, and the second reinforcing bead protrude from the second wall; the second ribs radially extend from the first and second reinforcing beads corresponding to the mounting component.

14. The reinforcing structure as claimed in claim 13, wherein the base comprises a first sidewall and a second sidewall; two ends of first and second walls connect to opposite ends of the first sidewall, and other two ends of the first and second walls connect to each other; and the second sidewall is opposite to the first sidewall.

15. The reinforcing structure as claimed in claim 13, wherein a portion of the second ribs arranged between the first reinforcing bead and a connecting rib radially extend from the first reinforcing bead and are inclined from the connecting rib to the first reinforcing bead; other portion of the second ribs arranged between the second reinforcing bead and the connecting rib radially extend from the second reinforcing bead and are inclined from the connecting rib to the second reinforcing bead.

16. The reinforcing structure as claimed in claim 11, wherein the reinforcing structure comprises at least one reinforcing portion, the at least one reinforcing portion is positioned on a corner of the second surface for reinforcing the rigidity of the base.

17. The reinforcing structure as claimed in claim 11, wherein each first and second supporting plates comprise a third surface, a first recess portion is recessed in the third surface for reinforcing rigidity of the corresponding first and second supporting plates.

18. The reinforcing structure as claimed in claim 17, wherein a second recess portion is recessed in the bottom of the first recess portion for further reinforcing rigidity of the corresponding first and second supporting plates.

* * * * *